(12) United States Patent
Huang et al.

(10) Patent No.: US 7,142,355 B2
(45) Date of Patent: Nov. 28, 2006

(54) ULTRA-LOW RIN FIBER LIGHT SOURCE

(75) Inventors: Sidney X. Huang, Glendale, AZ (US); Timothy L. Spicer, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/068,095

(22) Filed: Feb. 28, 2005

(65) Prior Publication Data

US 2006/0193033 A1   Aug. 31, 2006

(51) Int. Cl.
*H01S 3/00*  (2006.01)
(52) U.S. Cl. .................................... 359/333; 359/341.1
(58) Field of Classification Search ................ 359/333, 359/341.1
See application file for complete search history.

(56) References Cited

U.S. PATENT DOCUMENTS 6,658,189 B1 * 12/2003 Ajima et al. ................ 385/123
6,912,083 B1 * 6/2005 Ohishi et al. ................ 359/333
6,917,464 B1 * 7/2005 Shin et al. .................... 359/333

FOREIGN PATENT DOCUMENTS

JP   2003318468 A  * 11/2003

* cited by examiner

*Primary Examiner*—Mark Hellner
(74) *Attorney, Agent, or Firm*—Fogg & Associates, LLC; Scott V. Lundberg (57) ABSTRACT

An ultra-low RIN band fiber light source is provided. In one embodiment, the fiber light source includes at least one segment of optical fiber, one or more pump lasers, at least two wavelength division multiplexers and a reflective device. Each pump is adapted to output a power signal having a select wavelength and a select power level. Each wavelength division multiplexer is adapted to couple an associated power signal from at least one of the one or more pumps into the at least one segment of optical fiber to generate amplified spontaneous emission (ASE) signals having select parameters in the at least one segment of optical fiber. The reflective device is coupled to an end of the at least one segment of optical fiber and is adapted to reflect back a portion of the ASE signals.

57 Claims, 4 Drawing Sheets

ULTRA-LOW RIN FIBER LIGHT SOURCE

TECHNICAL FIELD

The following description relates to light sources and in particular to fiber light sources.

BACKGROUND

A fiber optic gyroscope (FOG) is an instrument used to measure angular rotation. Unlike conventional gyroscopes, a FOG has no mechanical moving parts. This feature gives a FOG several advantages over conventional gyroscopes. For example, a conventional gyroscope must get the gryo rotor spinning up to speed before it can provide readings whereas a FOG is always ready to give immediate readings. Additionally, unlike conventional gyroscopes, a FOG is less sensitive to g-forces. These advantages make a FOG especially suited for high performance applications such as satellites, submarines, strategic missiles, and pointing and stabilizations applications among others. As a result, FOGs are widely used in defense and commercial applications.

A typical FOG operates by passing light from a fiber light source through a beamsplitter where it is divided into two light waves with the same intensity. These two light waves then enter a fiber coil. One light wave will travel in a clockwise direction and the other in a counter-clockwise direction. The two light waves will join again as they leave the coil. If there is no rotation, the two light waves will travel equal optical path lengths and be in phase when they join, creating constructive interference. If there is rotation, the effective optical path length that the light waves travel will change and the two light waves will be out of phase when they join, creating destructive interference. The magnitude of the shift in phase is proportional to the rate of rotation and the interference intensity which is used to measure rotation. Current FOG random noise performance is limited by both the relative intensity noise (RIN), which is inversely proportional to the optical linewidth, and the output power of the fiber light source. Additionally, the gyro bias errors due to polarization cross coupling, Rayleigh back scattering and nonlinear Kerr effects can be significantly reduced by using a low RIN light source. Accordingly, it is desired to have a fiber light source with an ultra-low RIN (very broad optical linewidth) and high power to increase the performance of FOG systems.

For the reasons stated above and for the other reasons stated below which will become apparent to those skilled in the art upon reading and understanding the present specification, there is a need in the art for an improved fiber light source.

SUMMARY

The above-mentioned problems and other problems and limitations relating to fiber optic light sources are resolved by the present invention and will be understood by reading and studying the following specification.

In one embodiment, a fiber light source is provided. In one embodiment, the fiber light source includes at least one segment of optical fiber, one or more pump lasers, at least two wavelength division multiplexers and reflective device. Each pump is adapted to output a power signal having a select wavelength and a select power level. Each wavelength division multiplexer is adapted to couple an associated power signal from at least one of the one or more pumps into the at least one segment of optical fiber to generate amplified spontaneous emission (ASE) signals having select parameters in the at least one segment of optical fiber. The reflective device is coupled to an end of the at least one segment of optical fiber and is adapted to reflect back a portion of the ASE signals.

In another embodiment, a single stage fiber optical light source is provided. The light source includes at least one section of optical fiber, a forward pump, a first wavelength multiplexer, a backward pump, a second wavelength multiplexer and a reflective device. The forward pump is adapted to generate forward power signals having a first forward wavelength and a first forward power level. The first wavelength multiplexer is adapted to couple the forward power signals onto the at least one section of optical fiber to generate first ASE signals of select first wavelengths and first power levels in the at least one section of optical fiber and multiplex the ASE signals traveling through the optical fiber. The backward pump is adapted to generate backward power signals having a second backward wavelength and a second backward power level. A second wavelength multiplexer is adapted to couple the backward power signals onto the at least one section of optical fiber to generate second ASE signals of select second wavelengths and second power levels in the at least one section of optical fiber and multiplex the ASE signals traveling through the optical fiber. The reflective device is coupled to a first end of the optical fiber, the reflective device is adapted to reflect back a select amount of the first and second ASE signals traveling in the at least one section of optical fiber.

In yet another embodiment, a two stage fiber light source is provided. The light source includes first stage and a second stage. The first stage includes at least a first section of optical fiber, a first stage pump and a first stage multiplexer, a reflective device and an a first isolator. The second stage includes at least a second section of optical fiber, a second stage pump and a second stage multiplexer. The first section of optical fiber in the first stage is in communication with the second section of optical fiber in the second stage. The first stage pump is adapted to generate a first stage power signal having a first stage wavelength and first stage power level. The first stage multiplexer is adapted to couple the first stage power signal onto the first section optical fiber to generate first stage ASE signals in the first section of optical fiber. The second stage pump is adapted to generate a second stage power signal having a second stage wavelength and second stage power level. The second stage multiplexer is adapted to couple the second stage power signal onto the second section of optical fiber to generate second stage ASE signals in the second section of optical fiber. The reflective device is coupled to reflect back a portion of the first stage ASE signals in the first stage and the first isolator coupled to prevent ASE signals in the second stage from entering the first stage.

In still another embodiment, a method of producing an ultra-broad band emission from a fiber light source is provided. The method comprises exciting an optical fiber with a first power signal to generate first ASE signals having a first range of ASE signal wavelengths. Exciting the optical fiber with a second power signal to generate second ASE signals having a second range of ASE wavelengths. Reflecting a portion of the ASE signals back into the optical fiber at a first end of the optical fiber and outputting the ASE signals through a second end of the optical fiber.

In still further another embodiment, a method for producing an ultra-low RIN fiber light source is provided. The method comprises exciting one or more optical fibers in communication with each other in a first stage of the fiber light source with a first power signal to generate first ASE signals in the one or more optical fibers in the first stage, the first ASE signals having a select first wavelength range. Exciting one or more optical fibers in communication with each other in a second stage of the fiber light source with a second power signal to generate second amplified spontaneous emission (ASE) signals in the one or more optical fibers in the second stage, the second ASE signals having a select second wavelength range. Reflecting a part of the first ASE signals back into the one or more optical fibers in the first stage. Passing the first ASE signals in the first stage to the second stage. Mixing the first ASE signals from the first stage with the second ASE signals in the second stage to form combined ASE signals. Flattening the wavelength spectrum of the combined ASE signals and outputting the combined ASE signals.

In still yet another embodiment another fiber light source is provided. The fiber light source includes a means for generating an amplified spontaneous emission (ASE) signals in at least one section of optical fiber. A means of multiplexing the ASE signals through the at least one section of optical fiber. A means of reflecting back into the at least one section of optical fiber a portion of the ASE signals at a first end of the fiber light source and a means of outputting the ASE signals from a second end of the fiber light source.

DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description of the embodiments, reference is made to the accompanying drawings, which form a part hereof, and in which are shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of an ultra-low RIN fiber source (UFLS) as disclosed in the following detailed description provide various advantages and benefits. Components used in some embodiments of the present invention are commercial off-the-shelf (COTS) components. While specialty components could be used, significant cost savings result from the ability to use of COTS. For example, while specialty fiber, such as rare earth doped fiber or tellurite fiber could be used, standard silica based fiber used in the various embodiments will result in a reduction of cost. Even with the use of standard silicon based optic fiber, the performance of the various embodiments exceeds that of conventional fiber light sources (FLS). The linewidth (hereinafter also referred to as wavelength spectrum) of the signals generated by embodiments of an ULFS is approximately 2–3 times broader than the linewidth of conventional FLS which leads to a significant reduction of gyro angular random walk coefficient and bias errors such as Rayleigh scattering, polarization, and Kerr effects in fiber optic gyros (FOGs). The signals generated by embodiments of an UFLS are also higher power than those of conventional FLS while having a relative intensity noise (RIN) approximately 50–60% lower than conventional FLS. Additionally, the output signal of the various embodiments of an ULFS is very smooth and the coherence length of the output ASE signal of an UFLS is only about 32.5 μm whereas the coherence length of conventional FLS is around 100 μm. This shorter coherence length of light source makes the fiber optic gyro signal much more stable than those of conventional FLS. In addition, conventional FLSs tend to have narrower linewidth or high power, narrow linewidth. However, embodiments of the present invention have both high power and broad linewidth.

Figure 1:
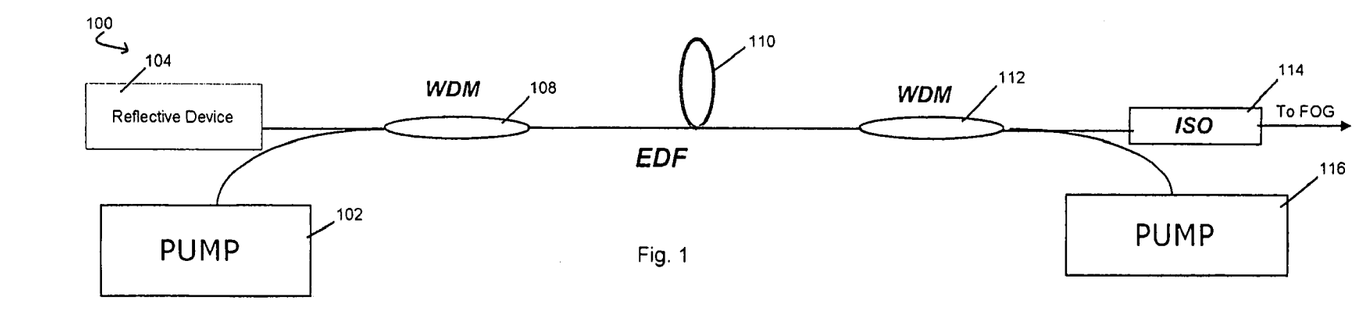
FIG. 1 is a diagram of one embodiment of a single stage ultra-low RIN fiber light source of one embodiment of the present invention.

FIG. 1 is a diagram of one embodiment of a single stage ultra-low RIN fiber light source indicated generally at 100. In this embodiment, the UFLS 100 includes a forward pump laser 102 and a backward pump laser 116. The two pumps excite the entire length of a section of optic fiber 110 which in this embodiment is an erbium-doped fiber (EDF) 110. In one embodiment, the forward pump 102 is a 1480 nm pump laser operating at 12 mW and the backward pump 116 is a 980 nm pump operating at 60.8 mW. In this embodiment, the EDF is 19.7 m long. In another embodiment, the EDF is 27.9 m long, the output power of the forward pump 102 is 24.7 mW and the output power of the backward pump 116 is 270 mW. In other embodiments, appropriate combinations of the output powers, length of optical fiber and types of optical fibers are used. Moreover, in some embodiments, rare-earth doped fiber is used.

The output power signals of the forward pump 102 and backward pump 116 are placed on the EDF through wavelength division multiplexers (WDMs) 108 and 112, respectively. In one embodiment laser power signals from forward pump 102 excites the optic fiber 110 to generate amplified spontaneous emission (ASE) signals with select characteristics. In one embodiment the optic fiber 110 is an erbium-doped fiber 110. Moreover, in one embodiment, the select characteristics produced by the power signal from the forward pump include ASE signals having a broadband 1520–1620 nm spectrum range and the characteristics produced by the power signals from backward pump 116 include ASE signals having a 1520–1570 nm spectrum range. A percentage of the combined ASE signals are reflected back to the EDF 110 by reflective device 104. In one embodiment, the reflective device is a fiber loop at the end of the EDF with a coupler which couples a percentage of the signal back into the EDF. In one embodiment, the coupler couples 10% of the signal back into the EDF. One advantage of using a fiber loop is the better performance of the loop over temperature changes than other reflective devices. In another embodiment, the reflective device 104 is a broadband reflector with approximately 37% reflectivity. In yet another embodiment, the reflective device is an angle on the end of the WDM such that it achieves 0.5–4% reflectivity of the ASE signal back to the EDF. In other embodiments, other reflective devices with appropriate reflectivity can be used.

The power signal output from pumps 102 and 116 are multiplexed with the reflected ASE signal by WDM 108 and WDM 112, respectively. In one embodiment, WDM 108 is a 1480/1550 multiplexer and WDM 112 is a 980/1550 multiplexer. Isolator 114 prevents light from a FOG (or any other device that uses a fiber light source) from being reflected back into UFLS 100 and allows the light to travel from UFLS 100 to the FOG. Embodiments of the present invention provide a combined ASE signal output having a relatively large linewidth in the range of 60 to 90 nm. In one embodiment, the combined ASE signals provide a 1520–1620 wavelength spectrum range. By increasing the linewidth, the relative intensity noise (RIN) of the light source is decreased. The equation for determining the intrinsic RIN of a light source is $RIN=\lambda^2/(c\Delta\lambda)$, where c is the speed of light, $\lambda$ is the wavelength of light, and $\Delta\lambda$ is the linewidth. The linewidth of the UFLS 100 in one embodiment of FIG. 1 is approximately 60 nm which is about 2 times broader than conventional fiber light sources. Additionally, by increasing the linewidth, the RIN is around 50% lower than conventional broadband fiber sources. UFLS 100 also has high power in addition to increasing the linewidth unlike conventional fiber optic light sources. In particular, the ASE output of this embodiment has generally a high power output of more than 100 mW. While particular values of pump wavelength and power, reflectivity, and EDF length have been used in different embodiments, it will be understood by one of skill in the art that other values may be used to achieve approximately the same linewidth, power and RIN.

Figure 2A:
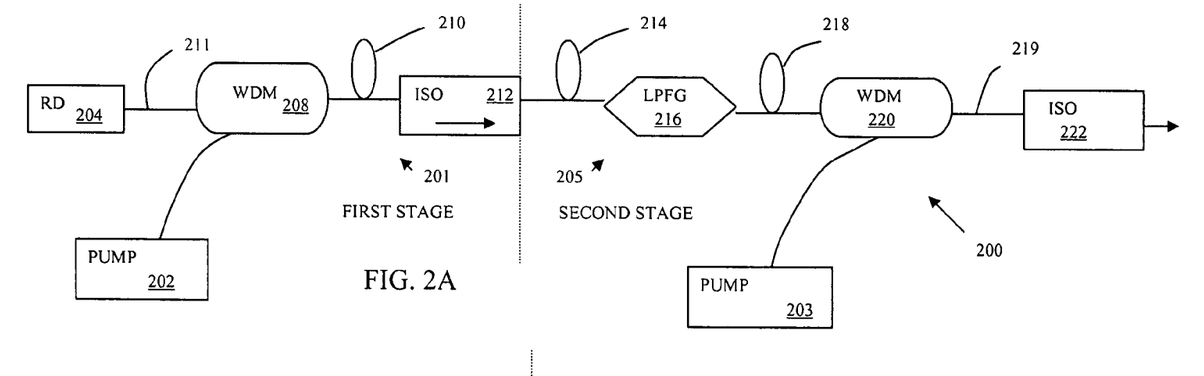
FIG. 2A is a diagram of one embodiment of a two-stage ultra-low RIN fiber light source of one embodiment of the present invention.

FIG. 2A is a diagram of an embodiment of a two-stage ultra-broad band fiber light source (UFLS) 200. UFLS 200 includes two pump lasers 202 and 203 adapted to excite respective optic fibers 210, 214 and 218 in two stages. In one embodiment, at least one of the optical fibers 210, 214 and 218 are erbium-doped fibers. Moreover, in one embodiment, the first stage 201 includes a forward pump 202, reflective device 204, WDM 208, isolator 212 and fiber optic sections 211 and 210. WDM 208 couples a power signal having a first stage wavelength and first stage power level from pump 202 onto the optical fiber section 210 to excite the optical fiber 210 into generating first stage ASE signals having select wavelengths. Moreover, WDM 208 further mixes the first stage ASE signals with reflected ASE signals from reflective device 204. Isolator 212 prevents reflection from the second signal stage 205 from entering the first stage 201. The reflective device 204 reflects back a select percentage of first stage ASE signals. In one embodiment, reflective device 204 is a broadband reflector with approximately 90% reflectivity. The broadband reflector 204 of the first stage 201 is designed to pass sufficient power and wavelength spectrum from the first stage 201 to the second stage 205. In one embodiment, fiber optic section 210 is approximately 50 nm long. The ASE signals generated in the first stage 201 are passed to the second stage 205 through isolator 212.

As illustrated in FIG. 2A, the second stage 205 in this embodiment includes pump laser 203, WDM 220, isolator 222, and optic fiber sections 214, 218 and 219. Fiber optic sections 214 and 218 are separated by a long period fiber grating (LPFG) 216. WDM 220 couples a second stage power signal from pump 203 onto optical fibers 214 and 218 to generate second stage ASE signals in the second stage 205 having select wavelengths. WDM 220 is also adapted to mix the first stage ASE signals with the second stage ASE signals to produce combined ASE signals having a broadband linewidth. In one embodiment the combined ASE signals provide a 1520–1620 nm wavelength spectrum. In one embodiment, the optical fibers 214 and 218 are EDF segments that are approximately 7 m and 5 m long respectively. LPFG 216 is adapted to adjust the gain spectrum of the second stage 205 and make the spectrum more flat and broad. Isolator 222 prevents ASE signal reflections from a FOG (or any other device requiring a fiber light source) from entering the second stage 205 of UFLS 200.

Figure 3A:
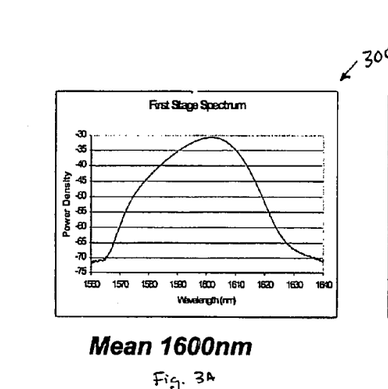
FIG. 3A is a wavelength spectrum chart of a first stage in a two stage ultra-low RIN fiber light source of one embodiment of the present invention.
Figure 3B:
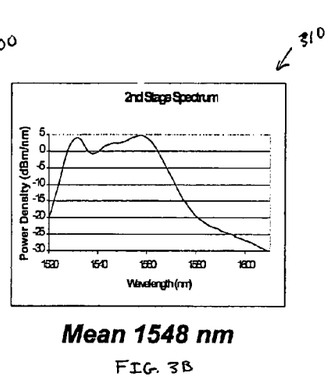
FIG. 3B is a wavelength spectrum chart of a second stage in a two stage ultra-low RIN fiber light source of one embodiment of the present invention.
Figure 3C:
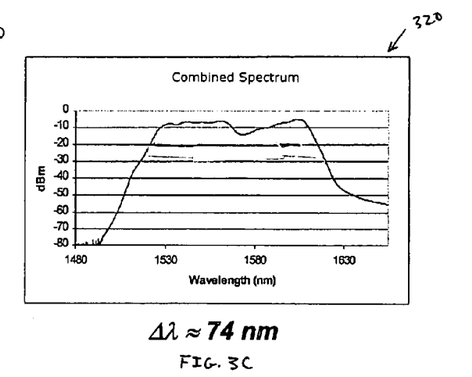
FIG. 3C is a combined wavelength spectrum chart of a two stage ultra-low RIN fiber light source of one embodiment of the present invention.

An example of a first stage spectrum 300 of ASE signals generated in the first stage of a two stage fiber light source is shown in FIG. 3A. An example of a second stage spectrum 310 of ASE signals in a second stage of a two stage fiber optic light source is illustrated in FIG. 3B. An example of a combine spectrum 320 of the combined ASE signals output from the second stage 205 is shown in FIG. 3C. In this example, the output of UFLS 200 has a measured linewidth of 74 nm, an approximate power of 35 mW, and an approximate RIN of −130 db/Hz. Hence, the output has relatively high power with a very broad spectrum and a RIN approximately 50–60% lower than conventional FLS. Additionally, the linewidth of UFLS 200 is approximately 2–3 times broader than conventional FLS. Furthermore, this light source with broad spectrum, high power and low RIN can be achieved using COTS components. Therefore, the cost UFLS 200 is reduced while producing results superior to conventional fiber light sources. In one embodiment, the forward pump is a 1480 nm pump having a power of 32 mW and the backward pump 203 is also a 1480 nm pump with a power of 137.2 mW.

Figure 2B:
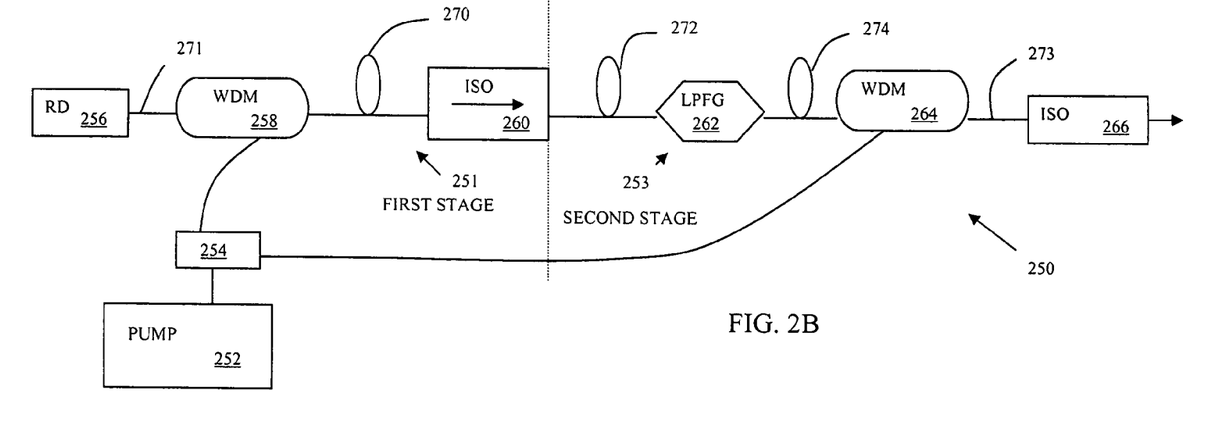
FIG. 2B is a diagram of another embodiment of a two-stage ultra-low RIN fiber light source of one embodiment of the present invention.

Referring to FIG. 2B another embodiment of a two stage fiber light source 250 is illustrated. In this embodiment, only one pump 252 is used. As illustrated, an output of pump 252 is split to feed the first and the second stages 251 and 253 of this two stage fiber light source 250. The first stage includes reflective device 256, WDM 258, ISO 260 and fiber optic sections 270 and 271. The second stage includes LPFG 262, WDM 264, ISO 266 and fiber optic sections 272, 274 and 273. In one embodiment, at least one of the fiber segments 270, 272 and 274 are EDF sections. In further one embodiment, EDF section 270 is approximately 50 m in length, EDF section 272 is approximately 10 m in length and EDF section 274 is 5 m in length. The output of pump 252 is split via coupler 204 to provide a power signal to the first stage 251 and a power signal to the second stage 253 from the same pump 202. In one embodiment, the coupler provides approximately 30% of the output power signal to the first signal and approximately 70% of the output power signal to the second stage. In one embodiment, pump 202 is a 1480 nm pump and the power of the power signal supplied to the first stage 251 is 22.4 mW while the power of the power signal supplied to the second stage is 114 mW. In other embodiments, the combinations of laser power and optic fiber are used. Moreover, the use of a coupler to split a laser signal for use in a two stage fiber light source can also be used in a single stage fiber light source.

Figure 4A:
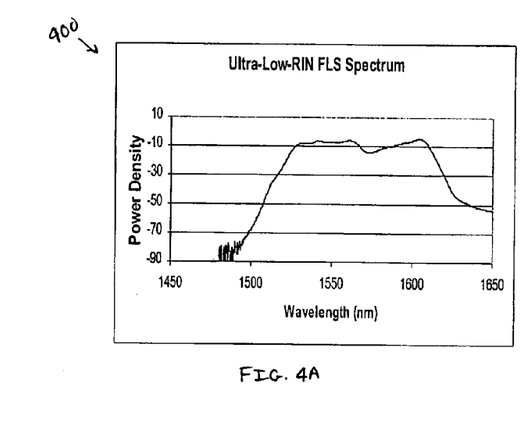
FIG. 4A is a wavelength spectrum of an ultra-low RIN fiber light source of one embodiment of the present invention.
Figure 4B:
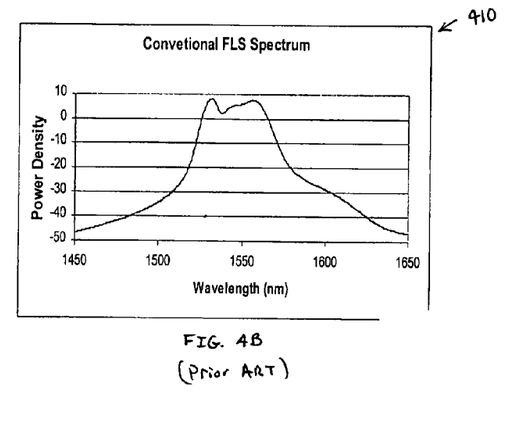
FIG. 4B is a wavelength spectrum of a conventional fiber light source of the prior art.

FIG. 4A illustrates a UFLS wavelength spectrum 400 of one embodiment of the present invention. For comparison, a conventional FLS wavelength spectrum 410 is illustrated in FIG. 4B. As illustrated and discussed above, the wavelength spectrum of an UFLS 400 is much broader than conventional fiber light sources. Moreover, the UFLS wavelength spectrum 400 is approximately twice as broad as the conventional wavelength spectrum 410 of a conventional fiber light source.

Figure 5:
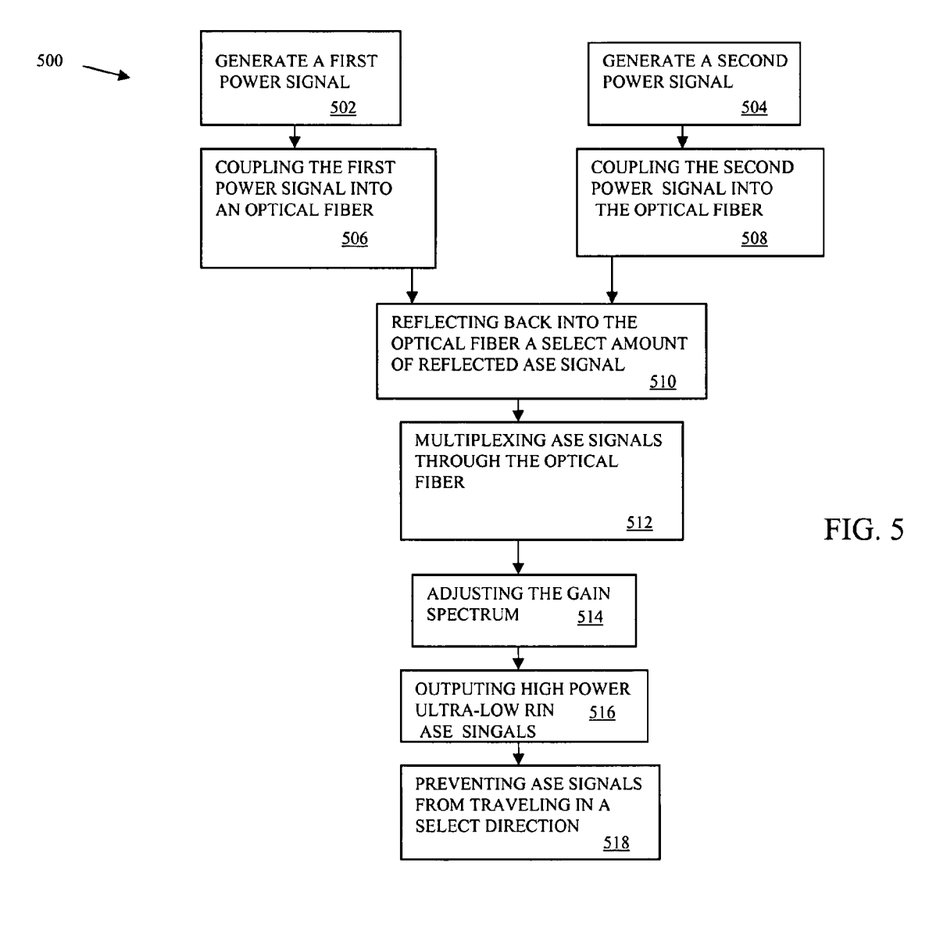
FIG. 5 is a flow diagram illustrating a method for producing an ultra-broad band ASC with embodiments of the present invention.

Referring to FIG. 5, a method of creating a high power ultra-broadband ASE of one embodiment of the present invention is illustrated. First of all, a first and second pump power signals are generated (502) and (504). In one embodiment, the first and second power signals are generated with a first and second pump laser. In another embodiment, the first and second power signals are generated by a single pump that has its output split into the first and second power signals having different power levels. The first and second power signals are then coupled to select optical fiber paths (506) and (508) which are in communication with each other. The optical fiber paths may include one or more sections (or segments of optical fiber) and can be generally referred to as the "optical fiber." In one embodiment, the first and second optical signals are multiplexed onto the optical fiber with associated multiplexers. The coupled power signals generate ASE signals in the optical fiber having select wavelengths. A select amount of signals are reflected off a reflective device back onto the optical fiber (510). In a single stage fiber light source the reflective device includes ASE signals created by both the first and second power signals. In a two stage fiber light source, only the first power signal coupled to a first stage and ASE signals are reflected by the reflective device. The reflected ASE signals and at least the first power signal are multiplexed through a section of the optical fiber (512). In a single stage fiber light source, all the ASE signals in the optic fiber are multiplexed in two different locations through the optical fiber. In a two stage fiber light source, the reflected signal and the first optical signal are multiplexed through the first stage and then multiplexed with the second optical signal through the second stage.

The gain spectrum of the ASE signals in the optical fiber is adjusted in one embodiment of the present invention to make the spectrum more flat and broad (514). In one embodiment, this is done with a long period fiber grading. ASE signals having a relatively high power ultra-broadband ASE is then output (516). An isolator is used to prevent reflections back of the high power ultra-low RIN ASE signals (518). In a two stage fiber light source, another isolator is used to prevent ASE signals in the second stage from entering the first stage. In one embodiment of the present invention, at least one of the one or more optical fiber paths is an erdium-doped fiber (EDF). Moreover, the reflective device in embodiments of the present invention may be any type of reflective device that reflects back a select amount of signal such as a broadband reflector, a fiber loop, an angle on the end of the fiber, or the like.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A fiber light source comprising:
at least one segment of optical fiber;
one or more pump lasers, each pump adapted to output a power signal having a select wavelength and a select power level;
at least two wavelength division multiplexers, each wavelength division multiplexer adapted to couple an associated power signal from at least one of the one or more pumps into the at least one segment of optical fiber to generate amplified spontaneous emission (ASE) signals having select characteristics in the at least one segment of optical fiber;
a reflective device coupled to an end of the at least one segment of optical fiber, the reflective device adapted to reflect back a portion of the ASE signals; and
a long period fiber grating adapted to adjust the gain spectrum of the ASE signals in the at least one segment of optical fiber.

2. The fiber light source of claim 1, further comprising:
at least one isolator coupled to present ASE signals from being reflected back to the fiber light source.

3. The fiber light source of claim 1, further comprising:
a coupler adapted to split the power signal from one of the one or more laser pumps into two split power signals having different power levels.

4. The fiber light source of claim 1, wherein at least one segment of the at least segment of optical fiber is one of a rare earth doped fiber, a silicon fiber and tellurite fiber.

5. The fiber light source of claim 1, further comprising:
a first isolator coupled to prevent the reflection of ASE signals in a first one of the at least one optical fiber; and
a second isolator coupled to prevent ASE signals from reflecting back to the fiber light source.

6. The fiber light source of claim 1, wherein the reflective device is one of a fiber optic loop with a coupler, a broadband reflector and an angle on the end of the at least one section of optical fiber.

7. A single stage fiber optical light source, the light source comprising:
at least one section of optical fiber;
a forward pump adapted to generate forward power signals having a first forward wavelength and a first forward power level;
a first wavelength multiplexer adapted to couple the forward power signals onto the at least one section of optical fiber to generate first amplified spontaneous emission (ASE) signals of select first wavelengths and first power levels in the at least one section of optical fiber and multiplex the ASE signals traveling through the optical fiber;
a backward pump adapted to generate backward power signals having a second backward wavelength and a second backward power level;
a second wavelength multiplexer adapted to couple the backward power signals onto the at least one section of optical fiber to generate second ASE signals of select second wavelengths and second power levels in the at least one section of optical fiber and multiplex the ASE signals traveling through the optical fiber;

a reflective device coupled to a first end of the optical fiber, the reflective device adapted to reflect back a select amount of the first and second ASE signals traveling in the at least one section of optical fiber; and a long period fiber grating adapted to adjust the gain spectrum of the ASE signals in the at least one segment of optical fiber.

8. The light source of claim 7, further comprising:

an isolator coupled proximate a second end of the optic fiber, the isolator adapted to prevent ASE signals from being reflected back into the at least one section of optical fiber.

9. The light source of claim 7, wherein the at least one segment is one of a rare earth-doped fiber, a silicon fiber and a tellurite fiber.

10. The light source of claim 7, wherein the reflective device is one of a fiber optic loop with a coupler, a broadband reflector and an angle on the first end of the at least one section of optical fiber.

11. The light source of claim 7, wherein the length of the at least one section of optical fiber is one of 19.7 m and 27.9 m.

12. The light source of claim 7, wherein the light source outputs ASE signals having relatively broad bandwidths generally in the range of 60 to 90 nm.

13. The light source of claim 7, wherein the first forward wavelength is approximately 1480 nm and the first forward power level is approximately one of 12 mW, 24.7 mW and 24 mW.

14. The light source of claim 7, wherein the second backward wavelength is approximately 980 nm and the first forward power level is approximately one of 60.8 mW, 270 mW and 340 mW.

15. The light source of claim of claim 7, wherein the reflective device is adapted to reflect approximately 0.5% to about 4% of the first and second ASE signals.

16. The light source of claim 7, wherein the forward pump is a 1480 nm pump.

17. The light source of claim 7, wherein the backward pump is a 980 nm pump.

18. The light source of claim 7, wherein mixing the first and second ASE signals in the at least one section of optical fiber generates a combined ASE single approximately in the 1520–1620 nm range.

19. The light source of claim 1, wherein the forward laser signal generates generally a weak C band and L band ASE signal in the at least one section of optical fiber and the backward laser signal generates a strong C band ASE in the at least one section of optical fiber.

20. The light source of claim 19, wherein the weak C band and L band ASE has a wavelength approximately 1520–1600 nm and the strong C band ASE has a wavelength of approximately 1520–1565 nm.

21. A two stage fiber light source, the light source comprising:

a first stage having at least a first section of optical fiber;

a second stage having at least a second section of optical fiber and a third section of optical fiber, the first section of optical fiber in the first stage is in communication with the second section of optical fiber in the second stage;

a first stage pump adapted to generate a first stage power signal having a first stage wavelength and first stage power level;

a first stage multiplexer adapted to couple the first stage power signal onto the first section optical fiber to generate first stage amplified spontaneous emission (ASE) signals in the first section of optical fiber;

a second stage pump adapted to generate a second stage power signal having a second stage wavelength and second stage power level;

a second stage multiplexer adapted to couple the second stage power signal onto the second section of optical fiber to generate second stage ASE signals in the second section of optical fiber;

a reflective device coupled to reflect back a portion of the first stage ASE signals in the first stage; and a first isolator coupled to prevent ASE signals in the second stage from entering the first stage.

22. The light source of claim 21, further comprising:

a second isolator couple to prevent ASE signals from reflecting back into the second stage.

23. The light source of claim 21, further comprising:

a long period fiber grading coupled to adjust the gain spectrum of the ASE signals.

24. The light source of claim 21, wherein at least one of the first, second and third sections of optical fiber is one of a rare earth-doped fiber, a silicon fiber and a tellurite fiber.

25. The light source of claim 21, wherein the reflective device is one of a fiber optic loop with a coupler, a broadband reflector and an angle on the first end of the at least one section of optical fiber.

26. The light source of claim 21, wherein the length of the first section of optical fiber is approximately 50 m.

27. The light source of claim 21, wherein the length of the second section of optical fiber is approximately 5 m.

28. The light source of claim 21, wherein the first stage wavelength is approximately 1480 nm and the first stage power level is one of 32 mW and 22.4.

29. The light source of claim 21, wherein the second stage wavelength is approximately 1480 nm and the second stage power level is approximately one of 137 mW and 114 mW.

30. The light source of claim 20, wherein the mixing of the first stage ASE signals and the second stage ASE signals in the second stage generates a relatively broadband ASE in the 1520 nm–1620 nm range.

31. The light source of claim 20, wherein the reflective device is adapted to reflect back approximately 90% of the first ASE signals.

32. A method of producing an ultra-broad band emission from a fiber light source, the method comprising:

exciting an optical fiber with a first power signal to generate first amplified spontaneous (ASE) signals having a first range of ASE signal wavelengths;

exciting the optical fiber with a second power signal to generate second ASE signals having a second range of ASE wavelengths;

reflecting a portion of the ASE signals back into the optical fiber at a first end of the optical fiber;

adjusting a gain spectrum of the ASE signals to be relatively flatter; and outputting the ASE signals through a second end of the optical fiber.

33. The method of claim 32, further comprising:

isolating ASE signals from reflecting back to the optical fiber.

34. The method of claim 32, further comprising:

adjusting the gain spectrum of the ASE signals to be relatively broad.

35. The method of claim 32, wherein exciting the optical fiber with the first and second laser signals further comprises;
multiplexing the first power signal into the optical fiber; and
multiplexing the second power signal into the optical fiber.

36. The method of claim 32, wherein the optical fiber is made up of a plurality of optical fiber segments which include at least a first optical fiber and a second optical fiber, the method further comprising:
isolating ASE signals in the second optical fiber from entering the first optical fiber.

37. The method of claim 32, wherein reflecting a portion of the ASE signals back to the optical fiber further comprises:
forming a loop at the first end of the optical fiber.

38. The method of claim 32, wherein reflecting a portion of the ASE signals back to the optical fiber further comprises:
using a broadband reflector to reflect back a percentage of the ASE.

39. The method of claim 32, wherein reflecting a portion of the ASE signals back to the optical fiber further comprises:
forming an angle at the first end of the fiber.

40. The method of claim 32, wherein the first range of ASE signal wavelengths is approximately 1520–1620 nm and the second range of ASE signal wavelengths is approximately 1520–1570 nm.

41. The method of claim 32, wherein the first range of ASE signal wavelengths is approximately 1560–1600 nm and the second range of ASE signal wavelengths is approximately 1520–1565 nm.

42. The method of claim 32, further comprising:
mixing the first range of ASE signals and the second range of the ASE signals to produce a relatively broad bandwidth high power output.

43. The method of claim 32, wherein the broad bandwidth is approximately 60–90 nm.

44. A method for producing an ultra-low RIN fiber light source, the method comprising:
exciting one or more optical fibers in communication with each other in a first stage of the fiber light source with a first power signal to generate first amplified spontaneous emission (ASE) signals in the one or more optical fibers in the first stage, the first ASE signals having a select first wavelength range;
exciting one or more optical fibers in communication with each other in a second stage of the fiber light source with a second power signal to generate second amplified spontaneous emission (ASE) signals in the one or more optical fibers in the second stage, the second ASE signals having a select second wavelength range;
reflecting a part of the first ASE signals back into the one or more optical fibers in the first stage;
passing the first ASE signals in the first stage to the second stage;
mixing the first ASE signals from the first stage with the second ASE signals in the second stage to form combined ASE signals;
flattening the wavelength spectrum of the combined ASE signals; and
outputting the combined ASE signals.

45. The method of claim 44, further comprising:
preventing the second ASE signals from reflecting back from the second stage to the first stage.

46. The method of claim 44, further comprising:
preventing reflections of the combined ASE signals from reentering the second stage.

47. The method of claim 44, wherein an optical fiber further comprises:
exciting an erbium doped fiber.

48. The method of claim 44, wherein flattening the wavelength spectrum of the combined ASE further comprises:
applying a long period fiber grating.

49. The method of claim 44, wherein the outputted combined ASE signal has a relatively broad bandwidth approximately in the range of 60 to 90 nm.

50. The method of claim 44, wherein the first and second laser signals are created by the same laser pump.

51. The method of claim 50, further comprising:
splitting an original power signal from a pump laser into the first and second power signals, wherein the first and second power signals have different power levels.

52. The method of claim 51, wherein the first power signal has approximately 30% of the power output and the second power signals has approximately 70% of the power output.

53. The method of claim 44, wherein exciting an optical fiber further comprises:
exciting a rare earth-doped fiber.

54. A fiber light source comprising:
a means for generating an amplified spontaneous emission (ASE) signals in at least one section of optical fiber;
a means of multiplexing the ASE signals through the at least one section of optical fiber;
a means of reflecting back into the at least one section of optical fiber a portion of the ASE signals at a first end of the fiber light source;
a means for adjusting the gain spectrum of the ASE signals in the at least one section of optical fiber; and
a means of outputting the ASE signals from a second end of the fiber light source.

55. The fiber light source of claim 54, further comprising:
a means for preventing the ASE signals from being reflected back into the at least one section of optical fiber at the second end of the fiber light source.

56. The fiber light source of claim 54, further comprising:
a means of coupling one of more power signals in the at least one section of optical fiber to generate the ASE signals.

57. The fiber light source of claim 54, further comprising:
a means for splitting a power signal into two separate power signals having different power levels to generate the ASE signals.

* * * * *

UNITED STATES PATENT AND TRADEMARK OFFICE
CERTIFICATE OF CORRECTION

PATENT NO.        : 7,142,355 B2
APPLICATION NO.   : 11/068095
DATED             : November 28, 2006
INVENTOR(S)       : Huang et al.

It is certified that error appears in the above-identified patent and that said Letters Patent is hereby corrected as shown below:

Claim 2, Column 8, Line 31, please replace "coupled to present ASE signals" with
--coupled to prevent ASE signals--

Claim 19, Column 9, Line 48, please replace "The light source of claim 1," with
--The light source of claim 7,--

Claim 47, Column 12, Line 10, please replace "wherein an optical fiber" with
--wherein exciting an optical fiber--

Signed and Sealed this
Seventh Day of August, 2012

David J. Kappos
*Director of the United States Patent and Trademark Office*